United States Patent Office 3,595,615
Patented July 27, 1971

3,595,615
RECOVERY OF HIGH PURITY AMMONIA AND HYDROGEN SULFIDE FROM AMMONIUM SULFIDES
Nicholas E. Kaparakos, Pittsburgh, Pa., assignor to Gulf Research & Development Company, Pittsburgh, Pa.
Filed Mar. 26, 1969, Ser. No. 810,689
Int. Cl. C01b 17/16; C01c 1/00
U.S. Cl. 23—193                                                13 Claims

ABSTRACT OF THE DISCLOSURE

Process effluent solutions comprising aqueous hydrogen sulfide and ammonia are treated to recover the ammonia essentially free of hydrogen sulfide impurity. Hydrogen sulfide is first stripped from the solution and recovered essentially free of ammonia. Ammonia is then stripped from the aqua ammonia bottoms of the hydrogen sulfide stripping operation and is removed as an overhead stream together with water vapor and some hydrogen sulfide impurity. The overhead stream is first cooled somewhat to condense a portion of its water vapor content which returns to the ammonia distillation as reflux. The remainder of the overhead stream is then further cooled to effect total condensation and to react substantially all the hydrogen sulfide impurity with ammonia to form $NH_4SH$ or $(NH_4)_2S$ salts, followed by flash vaporization with accompanying autorefrigeration. At the autorefrigeration temperature the vapor pressure of the salts is substantially nil so that the ammonia overhead of the flashing step is essentially free of hydrogen sulfide. The aqueous residue of the flashing step containing the salts is recycled to the hydrogen sulfide distillation.

---

Figure 1:
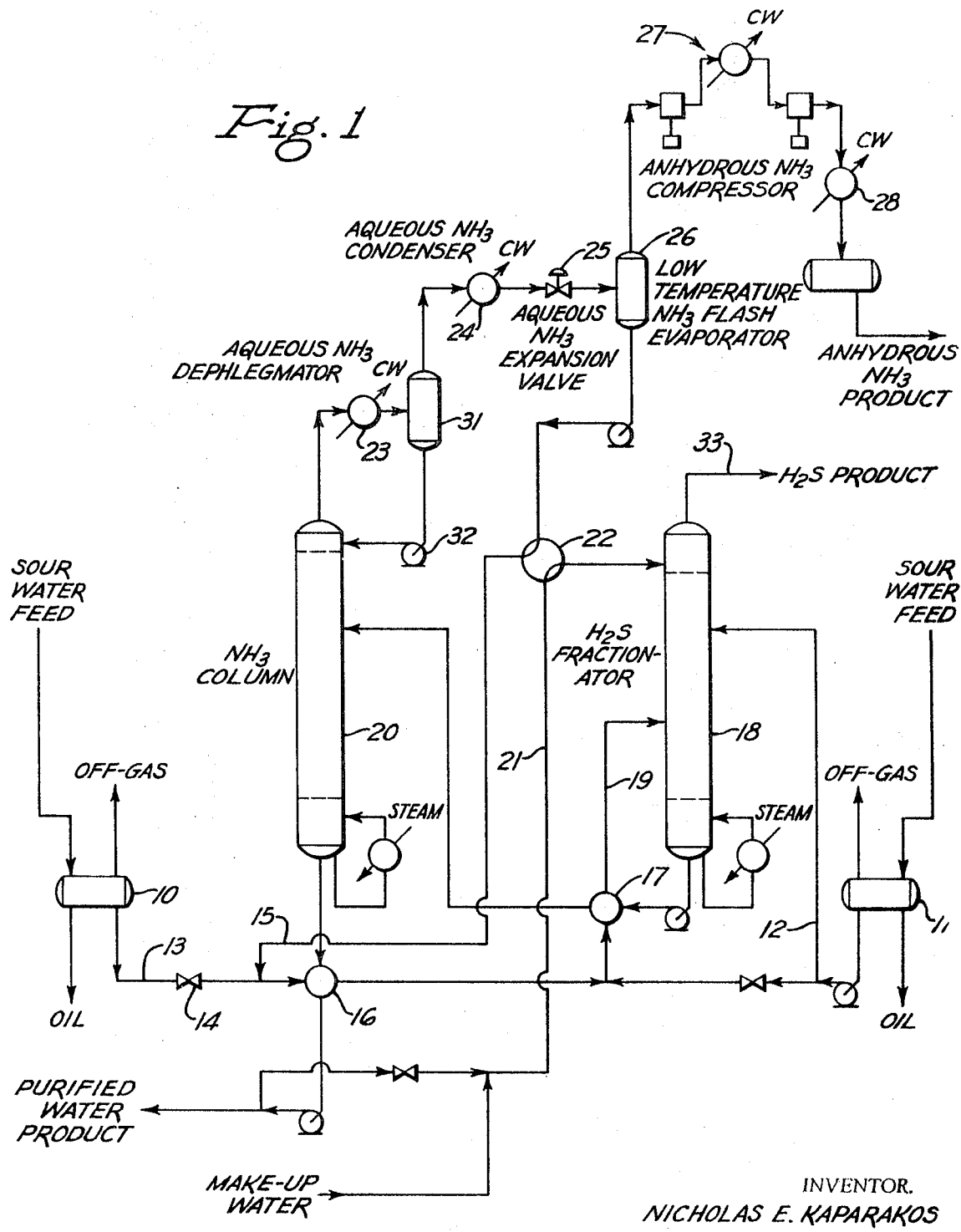

The object of this invention is to recover high yields of anhydrous $NH_3$ essentially free of $H_2S$ impurity and high purity $H_2S$ suitable for sulfuric acid or elementary sulfur production by treating aqueous $NH_4SH$ and $(NH_4)_2S$ solutions derived from crude oil hydrodesulfurization, hydrocracking, or other hydro-treating processes. The mole ratio of $H_2S$ to $NH_3$ in the aqueous solutions can vary widely and can be, for example, between about 0.5 to 1.2 and more usually between about 0.9 and 1.1. Rejuvenated water is recovered from the solution in a state of purity such that it can be safely discharged to public waterways.

The aqueous $NH_4SH$ and $(NH_4)_2S$ solution is treated to recover high purity $H_2S$ by distillation of the aqueous $NH_4SH$ and $(NH_4)_2S$ solution in an absorption-stripping type operation. It is possible to limit the residual $H_2S$ in the weak $NH_3$ liquor recovered in the reboiled bottoms from the $H_2S$ distillation to a molar ratio of $NH_3$ to $H_2S$ in excess of 10 to 1 by controlling the bottom temperature between about 300 and 425° F. and preferably between about 330 and 400° F. Chilled purified water and/or makeup water can be used in the top section of the $H_2S$ distillation tower to absorb the $NH_3$ from the stripped acid gas and permit recovery of at least about 99.7 percent purity $H_2S$ at about 40 to 60° F. containing less than about 1,000 p.p.m. of $NH_3$ impurity. Also, an internal aqueous $NH_3$ recycle solution containing about 30 to 70 percent $NH_3$ obtained from a source described below can be used to recover high purity anhydrous $NH_3$ from the dilute ammonia liquor bottoms of the $H_2S$ distillation.

The dilute $NH_3$ liquor bottoms of the $H_2S$ distillation is stripped in a separate distillation tower to obtain upflowing vapors of $NH_3$, $H_2O$ and $H_2S$ impurity and to recover purified water in the tower bottoms containing less than 1,000 p.p.m. $NH_3$ plus traces of $H_2S$ impurity. The hot aqueous $NH_3$ vapors pass upward over water cooled trays near the top of the $NH_3$ tower or through an external reflux condenser to col the vapors somewhat and condense a portion of their water vapor content which returns to the top section of the tower. This dephlegmation step serves to reduce the amount of water that passes through the subsequent aqueous $NH_3$ total condenser and to assist in maintaining the desired $NH_3$ concentration in the recycle aqueous $NH_3$ solution.

The aqueous $NH_3$ vapors following the dephlegmation step generally contain about 1 to 5 weight percent or more of $H_2S$, and in accordance with this invention, are totally condensed followng the dephlegmation step. Suitable conditions for the total condensation include temperatures between about 100 and 150° F. and pressures between about 100 and 250 p.s.i.a. under which the $H_2S$ reacts with $NH_3$ in the solution to form the corresponding salts. In this manner, essentially all of the $H_2S$ impurity is chemically combined in the ionized $(NH_4)_2S$ and $(NH_4)_2S$ salts if there is a large excess of $NH_3$ over $H_2S$ in the solution, such as a mole ratio of about 20 to 1 or higher.

The totally condensed aqueous $NH_3$ solution is then expanded from superatmospheric pressures to a vacuum in the range of about 2 to 15 p.s.i.a. This expansion achieves a twofold process objective: (1) it produces the autorefrigeration effect required to reduce the vapor pressure of the $(NH_4)_2S$ and $NH_4SH$ salts in solution to nearly a nil value, thereby holding the $H_2S$ impurity in the $NH_3$ product to only a trace, and (2) it permits recovery of anhydrous $NH_3$ vapor product containing preferably less than 0.5 weight percent $H_2O$ at temperatures between about $-10$ and 50° F., which is in equilibrium with low temperature aqueous $NH_3$ solution containing less $NH_3$ on a weight basis than the aqueous $NH_3$ solution obtained by the total condensation of aqueous $NH_3$ vapors. The ammonia vapor product can be used as commercial anhydrous ammonia or can be subsequently dissolved in water to provide commercial aqua ammonia. The low temperature residue solution of the flash vaporization contains between about 30 to 70 weight percent $NH_3$ and is used as a refrigerant for chilling the purified and/or makeup water reflux which is used in the $H_2S$ distillation, following which it is then recycled to the $H_2S$ distillation along with fresh charge.

The following example refers to FIG. 1. Two aqueous solutions, one containing 2.9 weight percent $NH_3$ and 5.7 weight percent $H_2S$ and the other containing 0.1 weight percent $NH_3$ and 0.4 weight percent $H_2S$ are charged to separators 10 and 11, respectively, for removing dissolved gas and/or separating entrained oil. The aqueous solution from separator 10 containing most of the $NH_3$ and $H_2S$ passes through line 13 and valve 14 to be combined with recycle aqueous $NH_3$ solution flowing in line 15. The mixture is heated in exchangers 16 and 17 to about 200–300° F. and is then fed to $H_2S$ distillation tower 18 through line 19. In the bottom section of this tower, $H_2S$ is stripped from the $NH_3$ by reboiled upflowing vapors. Since $NH_4SH$ and $(NH_4)_2S$ salts decompose to $NH_3$ and $H_2S$ at temperatures above 180° F., the tower bottom temperature is controlled between about 300 and 400° F. for limiting the residual $H_2S$ concentration in the bottoms to a molar ratio of $NH_3$ to $H_2S$ in excess of about 10 to 1. The pressure in the tower bottoms is between about 50 and 300 p.s.i.a. $NH_3$ vapor is absorbed from the $H_2S$ in the top section of tower 18 by the aqueous solution from separator 11 flowing to tower 18 through line 12 and by the purified water of the process and/or makeup water which is chilled to about 35–40° F. in chiller 22 using low temperature aqueous $NH_3$ recycle solution to provide the refrigeration requirement. $H_2S$ gas product of at least about 99.7 weight percent purity containing about 0.2 weight percent $H_2O$ plus traces of $NH_3$ impurity is recovered in line 33 at temperatures of about 40–60° F. and can be used to manufacture sulfuric acid or elementary sulfur.

Dilute $NH_3$ liquor recovered as the bottoms of tower 18 containing essentially the net aqueous $NH_3$ in the solution charged to separators 10 and 11 plus recycle aqueous $NH_3$ solution flowing in line 15 together with the residual $H_2S$ is cooled to about 250–300° F. in exchanger 17 and is then fed to distillation tower 20. $NH_3$ and $H_2S$ vapors are stripped from the dilute $NH_3$ liquor in the bottom section of tower 20 below the feed tray by reboiled upflowing vapors. Purified water containing less than 1,000 p.p.m. of $NH_3$ plus a trace of $H_2S$ impurity is recovered as tower 20 bottoms and is passed through heat exchanger 16. The purified water can be safely discharged to rivers or reused in the oil hydrotreating process from which the sour water is obtained. Tower 20 bottom temperature and pressure conditions are about between 300/400° F. and 80–260 p.s.i.a., respectively. Upflowing aqueous $NH_3$ vapors above the feed tray are refluxed with hot dilute aqueous $NH_3$ solution at about 260–320° F. The reflux is condensed out from overhead vapor in dephlegmator 23 and returned to the tower via vessel 31 and pump 32. Condenser 23 condenses out only a portion of the water vapor in the overhead of tower 20 and most of the aqueous $NH_3$ vapor from tower 20 is not condensed at condenser 23. The non-condensed vapor contains about 1 to 5 weight percent of $H_2S$ impurity and is passed to condenser 24 where it is totally condensed at temperatures between about 100 and 150° F. at which temperatures the $H_2S$ and the $NH_3$ in the solution are reacted to form the corresponding $(NH_4)_2S$ and $NH_4SH$ salts. Essentially all of the $H_2S$ impurity is chemically combined as ionized salts in aqueous solution if there is a large excess of $NH_3$ over $H_2S$ in the solution, such as a mole ratio of at least about 20 to 1 or higher. The totally condensed solution at a pressure of about 100 to 250 p.s.i.a. is expanded through valve 25 to a vacuum of about 2 to 15 p.s.i.a. to produce an autorefrigeration effect sufficient to reduce the vapor pressure of the $(NH_4)_2S$ and $NH_4SH$ salts in the solution preferably to almost a nil value but to any value sufficiently low that the $H_2S$ impurity in the anhydrous $NH_3$ recovered by flash vaporization in vessel 26 is limited to only a trace.

High purity anhydrous $NH_3$ vapor product containing preferably less than 0.5 weight percent $H_2O$ plus only a trace of $H_2S$ impurity and an aqueous $NH_3$ solution in equilibrium with the $NH_3$ vapor are recovered from vessel 26 at temperatures between about −10 and 50° F. The low temperature solution contains essentially all of the residual $H_2S$ impurity in the dilute $NH_3$ liquor taken as bottoms from tower 18 and is used to chill the purified and/or makeup water reflux passing through chiller 22 before it is recycled to the $H_2S$ distillation tower through line 15. Anhydrous $NH_3$ vapor from vessel 26 is compressed to about 235 p.s.i.a. in compressor system 27 and then condensed at about 100° F. in condenser 28 to recover liquid anhydrous $NH_3$. In the above example, about 5.4 tons per day of anhydrous $NH_3$ of 99.5 weight percent purity and 11.2 tons per day of $H_2S$ of 99.7 weight percent purity are recovered from treating about 60 g.p.m. of the combined sour water effluent streams.

After both first stage compression in compressor 27 and interstage cooling some aqueous $NH_3$ liquid can form and be discharged through a liquid trap prior to second stage compression. Because of the large excess of $NH_3$ present, any traces of $H_2S$ present will react with the ammonia and be removed as salts dissolved in the material passing through the liquid trap for return to the $H_2S$ distillation. The anhydrous $NH_3$ vapor then passed to the second compression stage will be essentially free of $H_2S$.

Figure 2:
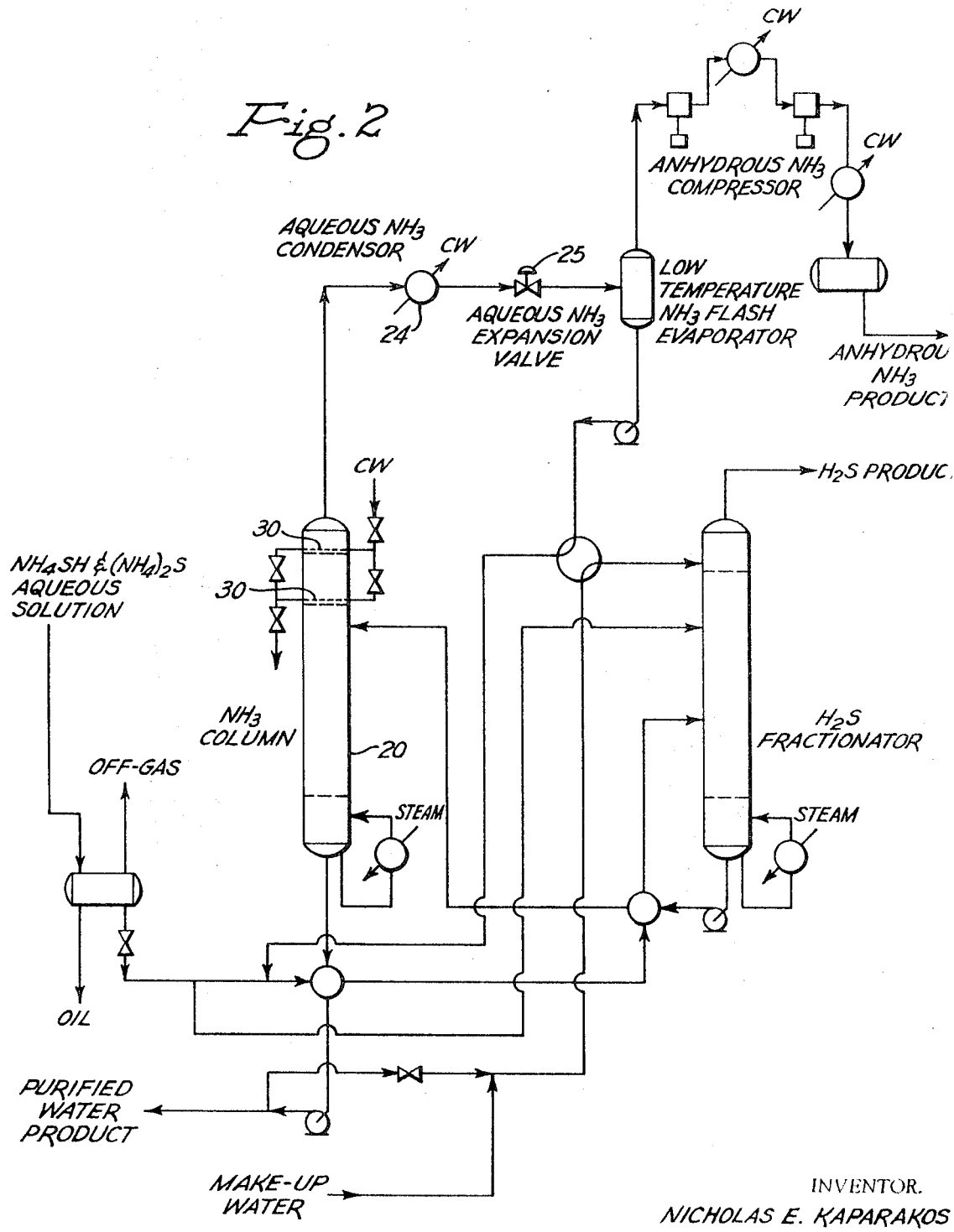

A modified system is shown in FIG. 2 wherein water cooled trays 30 at the top of $NH_3$ distillation column 20 are provided to enrich the $NH_3$ concentration in the upflowing vapors by controlling the condensation of water vapor. Water cooled trays 30 replace aqueous $NH_3$ dephlegmator 23 of FIG. 1. The system of FIG. 2 is otherwise similar to the system of FIG. 1 except that only one sour water charge stream is employed.

I claim:

1. A process for treating an aqueous solution to recover $H_2S$ and $NH_3$ contained therein comprising distilling and recovering $H_2S$ from said solution and recovering an aqueous $NH_3$ bottoms containing $H_2S$ impurity, separately treating said aqueous $NH_3$ bottoms to distill therefrom a stream comprising water vapor, $NH_3$ and $H_2S$ impurity, condensing out a portion of said water vapor from said stream leaving a remainder of said stream, totally condensing the remainder of said stream to react substantially all the $H_2S$ impurity therein with $NH_3$ to form an aqueous solution of the corresponding salts, expanding and flashing said totally condensed salt solution to provide an autorefrigeration effect under which said salts have a low vapor pressure and under which the low vapor pressure of said salts permits overhead recovery of $NH_3$ substantially free of $H_2S$.

2. The process of claim 1 wherein said portion of water vapor condensed is utilized as reflux in the distillation of the $NH_3$ bottoms.

3. The process of claim 1 wherein said autorefrigeration effect reduces the vapor pressure of said salts to substantially a nil value.

4. The process of claim 1 wherein the $NH_3$ recovered substantially free of $H_2S$ is substantially anhydrous $NH_3$.

5. The process of claim 1 including the recycle to said $H_2S$ distillation step of the aqueous solution of the salts recovered from said flashing step.

6. The process of claim 1 including the step of recovering an aqueous bottom stream containing small amounts of $NH_3$ and $H_2S$ from the distillation of said $NH_3$ bottoms.

7. A process for the treatment of aqueous $NH_3$ containing $H_2S$ impurity comprising distilling from said aqueous $NH_3$ an overhead stream comprising water vapor, $NH_3$ and $H_2S$ impurity, condensing out a portion of said water vapor from said stream leaving a remainder of said stream, totally condensing the remainder of said stream to react substantially all of the $H_2S$ impurity therein with $NH_3$ to form an aqueous solution of the corresponding salts, expanding and flashing said totally condensed salt solution to provide an autorefrigeration effect under which said salts have a low vapor pressure and under which the low vapor pressure of said salts permits overhead recovery of $NH_3$ substantially free of $H_2S$.

8. The process of claim 7 wherein said portion of water vapor condensed is utilized as reflux in said $NH_3$ distillation.

9. The process of claim 7 wherein said autorefrigeration effect reduces the vapor pressure of said salts to substantially a nil value.

10. The process of claim 7 wherein the $NH_3$ recovered substantially free of $H_2S$ is substantially anhydrous $NH_3$.

11. The process of claim 7 including the step of recovering an aqueous bottoms stream containing small amounts of $NH_3$ and $H_2S$ from the ammonia distillation.

12. The process of claim 1 wherein the distillation in said $H_2S$ distilling and recovering step occurs at a pressure of about 50 to 300 p.s.i.a., said aqueous $NH_3$ bottoms are distilled at a pressure of about 80 to 260 p.s.i.a., and said total condensation step occurs at a temperature of about 100 to 150° F. and a pressure of about 100 to 250 p.s.i.a.

13. The process of claim 7 wherein said aqueous $NH_3$ distillation pressure is about 80 to 260 p.s.i.a. and said total condensation step occurs at a temperature of about 100 to 150° F. and a pressure of about 100 to 250 p.s.i.a.

References Cited

UNITED STATES PATENTS 3,335,071  8/1967  Bollen et al. _____ 23—193

EARL C. THOMAS, Primary Examiner

H. S. MILLER, Assistant Examiner

U.S. Cl. X.R.

23—2R, 181